United States Patent
Chen et al.

(10) Patent No.: US 7,147,534 B2
(45) Date of Patent: Dec. 12, 2006

(54) PATTERNED CARBON NANOTUBE PROCESS

(75) Inventors: Shih-Hsun Chen, Taipei (TW); Chun-Yen Hsiao, Taipei (TW); Shih-Chien Hsiao, Taipei (TW); Shie-Heng Lee, Taipei (TW); Kuei-Wen Cheng, Taipei (TW)

(73) Assignee: Teco Nanotech Co., Ltd., Taipei (TW)

( * ) Notice: Subject to any disclaimer, the term of this patent is extended or adjusted under 35 U.S.C. 154(b) by 218 days.

(21) Appl. No.: 10/860,002

(22) Filed: Jun. 4, 2004

(65) Prior Publication Data

US 2005/0272342 A1    Dec. 8, 2005

(51) Int. Cl.
*H01J 9/12* (2006.01)
*B05D 1/32* (2006.01)
*B05D 3/02* (2006.01)
*B29C 71/02* (2006.01)

(52) U.S. Cl. .......................... 445/50; 445/49; 445/51; 427/466; 427/532; 427/541

(58) Field of Classification Search ............. 445/49–51
See application file for complete search history.

(56) References Cited

U.S. PATENT DOCUMENTS

| | | | |
|---|---|---|---|
| 6,239,547 B1 * | 5/2001 | Uemura et al. | 313/495 |
| 6,528,020 B1 * | 3/2003 | Dai et al. | 422/98 |
| 6,811,457 B1 * | 11/2004 | Cheng et al. | 445/51 |
| 2001/0004979 A1 * | 6/2001 | Han et al. | 216/4 |

FOREIGN PATENT DOCUMENTS

| CN | 502395 | 2/1993 |
|---|---|---|

* cited by examiner

*Primary Examiner*—Nimeshkumar D. Patel
*Assistant Examiner*—Natalie K. Walford
(74) *Attorney, Agent, or Firm*—Troxell Law Office, PLLC

(57) ABSTRACT

A patterned carbon nanotube process adopted for an electronic device is described. A negative photoresist layer is coated on a cathode substrate. A mask layer is formed with a carved cavity therein during a development process. A carbon nanotube spray is sprayed thereon to fill the carved cavity with a plurality of carbon nanotubes. The cathode substrate is sintered at a high temperature or in a vacuum to remove the mask layer and part of the carbon nanotubes adhered to the mask layer simultaneously, and to connect the rest of the carbon nanotubes firmly to the cathode conductive layer as an electron emitter layer with high resolution for increasing current density and uniformity of illumination of the electronic device.

7 Claims, 3 Drawing Sheets

PATTERNED CARBON NANOTUBE PROCESS

BACKGROUND OF THE INVENTION

1. Field of the Invention

The present invention relates to a technique of coating a cathode electron emitter layer a FED (Field Emission Display), and particularly relates to a method for manufacturing a cathode electron emitter layer patterned via a patterned carbon nanotube process.

2. Background of the Invention

A FED is a device that utilizes a cathode electron emitter to generate surrounding electrons within an electric field; the electrons excite the phosphors coated on an anode for lighting. The FED is lightweight, thin and flimsy; the effective area thereof is variable to meet requirements but without the view angle problems that occur in a flat LCD (Liquid Crystal Display).

FIG. 1 shows a conventional FED 1a including a unit 5a within an anode 3a and a cathode 4a disposed therein, and a rib 53a arranged therebetween for separating the anode 3a from the cathode 4a and support. The anode 3a includes an anode glass substrate 31a, an anode conductive layer 32a, and a phosphors layer 33a arranged sequentially. The cathode 4a includes a cathode glass substrate 41a, a cathode electrode layer 42a, and a cathode electron emitter layer 43a arranged sequentially. The rib 53a connects the anode 3a and the cathode 4a, and a vacuum is accordingly formed therein. The cathode electron emitter layer 43a generates electrons for emission onto the phosphors layer 33a to produce light via an additional electric field; in addition, the rib 53a must be made of a insulating material to prevent conduction between the anode 3a and the cathode 4a while in the additional electric field. The additional electric field has a strength that depends on and is directly proportional to a voltage over the anode 3a and the cathode 4a, but is inversely proportional to a distance between the anode 3a and the cathode 4a. Therefore, thickness uniformity of each layer of the anode 3a and the cathode 4a and even height of the rib 53a decide a luminance uniformity of the conventional FED 1a.

Iijima refers to a new material of carbon nanotube in 1991 (*Nature* 354, 56 (1991)); the new material has high aspect ratio, height mechanical intensity, high chemical resistance, high abrasion resistance, low threshold electric field, and other similar characteristics. The new material is adopted for field emission electrons and researched generally (*Science* 269, p1550 (1995); SID'98 Digest, P1052 (1998); SID'01 Digest, p316 (2001)). The field emission electrons are generated by escape from a material surface to be free electrons; a material surrounds in a high electric field to reduce an energy barrier thereof, electrons in the material then escape from the material surface by the quantum-mechanical tunneling effect (*J. Appl. Phys.* 39,7, pp 3504–3504 (1968)). An electric current accompanying the field emission electrons can be improved via the material with a low function, and the field emission electrons are generated via the additional electrical field, but not a heat source, so that devices equipped with the field emission electrons are called cold cathodes and are generally applied to a cathode electron emitter layer of a FED.

Manufacturing a cathode electron emitter layer of a FED includes at least two methods. One method is a chemical vapor deposition (CVD) process for depositing carbon atoms on a cathode substrate to be carbon nanotubes. A metal catalyst film is patterned first, and the carbon nanotubes grows from the metal catalyst film by the chemical vapor deposition process. Although the carbon nanotubes can be manufactured stably, each with a uniform length, the metal catalyst film is maintained still, and this will affect field emission electrons efficiency and further needs a surface treatment to increase the efficiency thereby. In addition, the CVD process is expensive and may restrict a size of the FED to less than 20 inches. Another method of a screen printing process can reduce costs thereof (disclosed in Taiwan Patent No. 502395); however, an electron emitter layer 60 (illustrated in FIG. 2) fabricated by a screen printing process still has some problems to be resolved. First, a paste comprising carbon nanotubes usually includes a viscosity above 100,000 cPs (centi-poise) to maintain a precision and a figure of a printing pattern. Second, for mating with a thickness of an emulsion and a fabric structure of a screen plate, the printing pattern has a size of more than 70 micrometers ($\mu m$) and meets high-resolution requirements with difficulty. Furthermore, the printing pattern has a thickness of 10 micrometers ($\mu m$) at least; the screen plate includes meshes, the thickness of which varies from 4 to 8 micrometers ($\mu m$) to influence a uniformity of the FED. Third, the aspect ratio of each of the nanotubes 62 is high enough (usually more than 40) to spread in the paste, but length of each nanotube 62 is restrictive due to the second reason, which is that the carbon nanotubes 62 still are easily buried in the paste, such as binders or conductive materials 61, after a sintering process, and the efficiency of electron generation is thereby decreased. For example, the electron emitter layer 60 fabricated by the screen printing process provides an electric current less than 10 mini amperes per square centimeter ($mA/cm^2$) under an electric field of less than 4 volts per micrometer (V/micrometer ($\mu m$)).

Hence, an improvement over the prior art is required to overcome the disadvantages thereof.

The inventor utilizes a nanotube spray disclosed in T.W. Application No. 92131590, applied with a negative photoresist mask, to make a cathode electron emitter layer with high resolution according to the present invention. First, the negative photoresist mask is made of macromolecule polyester-polymer materials and negative photoresist for manufacturing a patterned electron emitter layer with high resolution; second, the negative photoresist mask and some carbon nanotubes disposed thereon can be removed by a sintering process simultaneously; third, the carbon nanotubes distribute uniformly by a spraying method for increasing efficiency of electron generation.

SUMMARY OF INVENTION

The conventional CVD process manufactures the carbon nanotubes on the cathode to provide the cathode electron emitter layer with high resolution; however, the conventional CVD process is only applicable to silicon wafers and is expensive and complicated. The screen printing process easily buries the carbon nanotubes in the paste and cannot provides a uniform height of each carbon nanotube thereby, and the electric current decreases and fails to provide the cathode electron emitter layer with high resolution. Thus, the inventor combines methods of the negative photoresist mask and the carbon nanotubes spray, which maintain high uniformity of the thickness and high electric currents, to be the cathode electron emitter layer with high resolution, and further removes the negative photoresist mask by the sintering process.

The primary object of the invention is therefore to specify a patterned carbon nanotube process to provide an electron emitter layer with high resolution.

The secondary object of the invention is therefore to specify a patterned carbon nanotube process that provides easy formation and removal of a mask layer.

The third object of the invention is therefore to specify a patterned carbon nanotubes process than sprays on the carbon nanotubes for increasing a current density.

According to the invention, these objects are achieved by a patterned carbon nanotubes process to make an electron emitter layer formed. A negative photoresist layer made of macromolecule polyester-polymer materials and having a polarization approaching a carbon nanotube spray is selected. A mask layer is developed on a cathode substrate. The mask layer includes a carved cavity formed therein, which carved cavity is filled with the carbon nanotube spray, and part of the carbon nanotube spray scattered on a surface of the mask layer will then dry and be removed by sintering. The carved cavity defines a size of at least 20×20 square micrometers ($\mu m^2$) and is separated by at most 20 micrometers ($\mu m$). The carbon nanotube spray is used to increase current density thereof.

The present invention comprises a negative photoresist macromolecule polyester (a dry film with a thickness of at least 10 micrometers ($\mu m$)) adopted for a developing process and the negative photoresist macromolecule polyester can be removed by a high temperature or a vacuum sintering process, a developer etching for the negative photoresist macromolecule polyester to form the mask layer, a carbon nanotube spray that vaporizes within the range of predetermined temperatures including a plurality of carbon nanotubes dispersed therein, a binder arranged therein for connecting the carbon nanotubes to the cathode conductive layer of an electronic device, and a dispersing agent to disperse the powder in the carbon nanotube spray.

The present invention provides a patterned carbon nanotube process adopted for an electronic device and includes the steps of: (1) coating a negative photoresist layer on a cathode substrate; (2) making a mask layer formed with a carved cavity during a developing process; (3) spraying with a carbon nanotube spray to fill the carved cavity with a plurality of carbon nanotubes; and (4) sintering the cathode substrate at high temperature or in a vacuum to remove the mask layer and part of the carbon nanotubes adhered to the mask layer, simultaneously, and to connect the rest of the carbon nanotubes firmly to the cathode conductive layer to serve as an electron emitter layer.

To provide a further understanding of the invention, the following detailed description illustrates embodiments and examples of the invention. Examples of the more important features of the invention thus have been summarized rather broadly in order that the detailed description thereof that follows may be better understood, and in order that the contributions to the art may be appreciated. There are, of course, additional features of the invention that will be described hereinafter and which will form the subject of the claims appended hereto.

BRIEF DESCRIPTION OF THE DRAWINGS

These and other features, aspects, and advantages of the present invention will become better understood with regard to the following description, appended claims, and accompanying drawings, where:

DETAILED DESCRIPTION OF THE EMBODIMENTS

Figure 1:
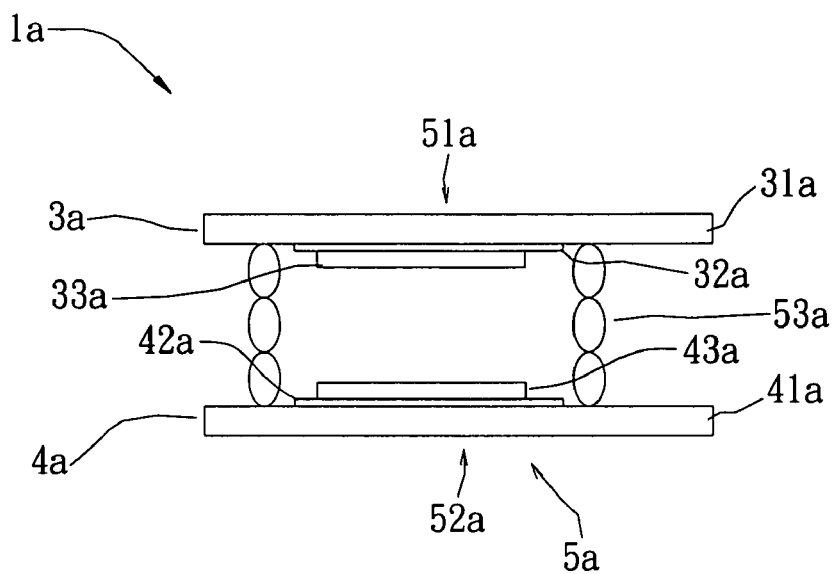
FIG. 1 is a perspective view of a conventional FED.
Figure 2:
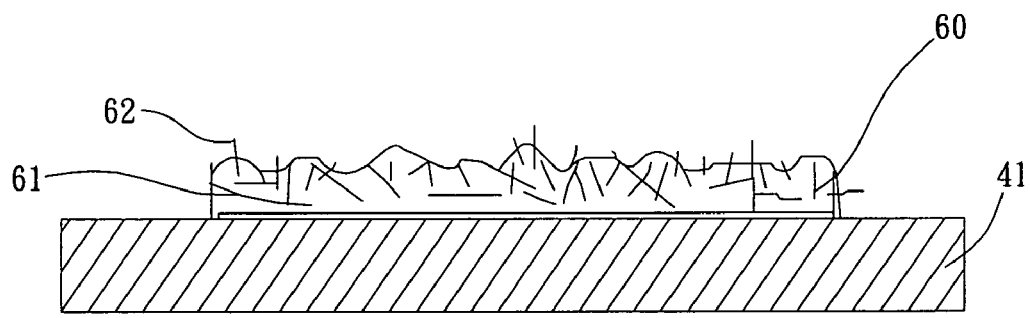
FIG. 2 is an enlarged view of a cathode electron emitter layer via a screen-printing process.
Figure 3:
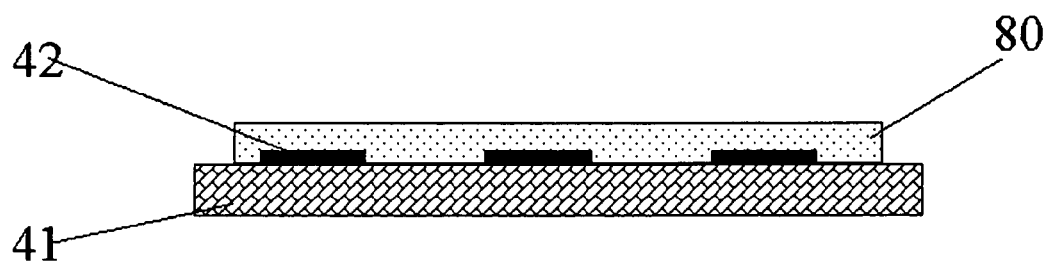
FIG. 3 is a perspective view for coating a photoresist layer according to the present invention.
Figure 4:
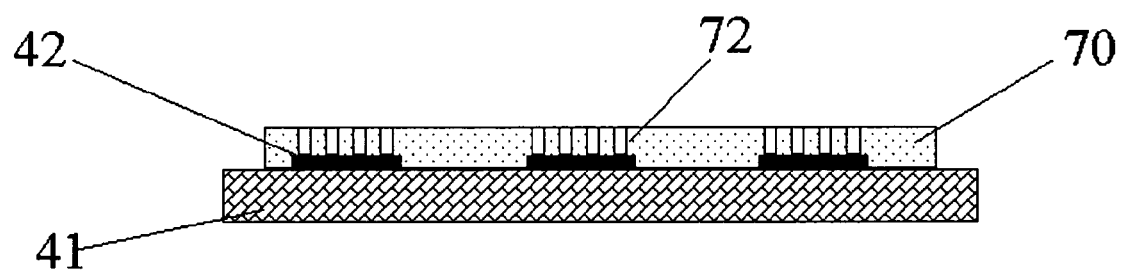
FIG. 4 is a perspective view of a development process according to the present invention.
Figure 5:
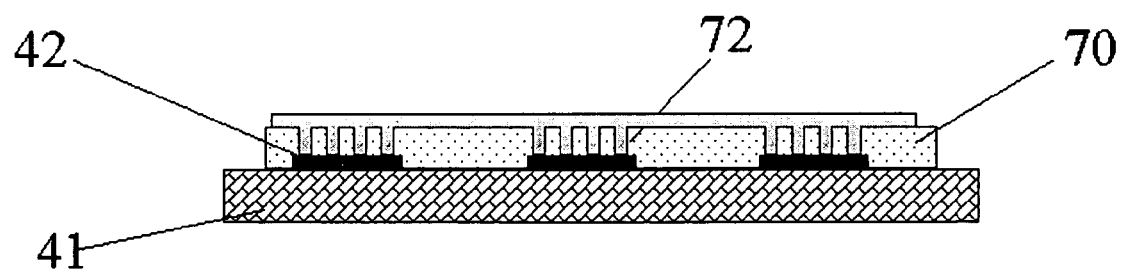
FIG. 5 is a perspective view for spaying a nanotube spay according to the present invention.
Figure 6:
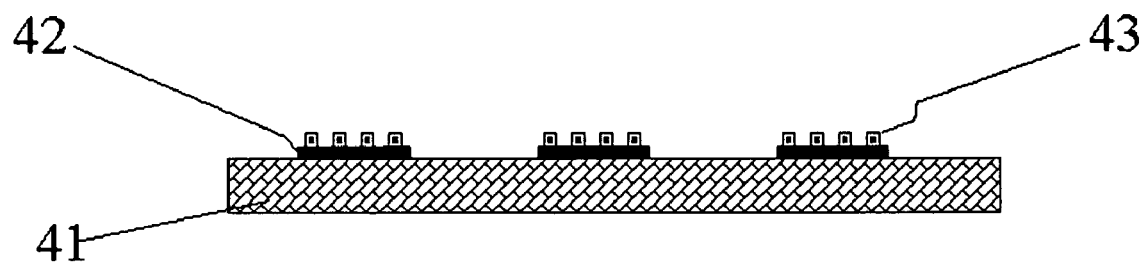
FIG. 6 is a perspective view of a patterned carbon nanotube according to the present invention.

The present invention provides a patterned carbon nanotube process to make an electron emitter layer patterned with high resolution. Negative photoresist macromolecule polyester materials are provided to serve as a negative photoresist layer, and then the negative photoresist layer is sprayed with a carbon nanotube spray. The negative photoresist layer is dried out and a plurality of carbon nanotubes in the carbon nanotube spray are connected to a cathode of an electronic device in a sintering process. The carbon nanotubes patterned can provide high resolution and a thin film thereof provides a high degree of uniformity of illumination and current density.

Referring to FIGS. 3 to 7, the present invention provides negative photoresist macromolecule polyester materials or negative photoresist dry films spin-coated or printed on a cathode substrate 41 as a negative photoresist layer 80. Alternatively, the present invention provides negative photoresist dry films laminated on the cathode substrate 41 as the negative photoresist layer 80. A carbon nanotube spray has a plurality of carbon nanotubes 62 arranged therein and is sprayed as a carbon nanotube film to cover the negative photoresist layer 80; the carbon nanotube film has a thickness of at most 5 micrometers ($\mu m$) to prevent carbon nanotube residue after the sintering process, thus, the negative photoresist layer 80 should have a thickness of at least 10 micrometers ($\mu m$). Furthermore, a predetermined maximum limitation of the thickness of the negative photoresist layer 80 still has to be defined to avoid restrictions on the size and thickness of the carbon nanotube film. The negative photoresist layer 80 is developed into a mask layer 70 and a plurality of carved cavities 72 therein in an alternating manner. The carved cavities 72 are locations for spraying with the carbon nanotube spray. The carbon nanotube spray fills the carved cavities 72 with the carbon nanotubes 62 and the carbon nanotube film covers both the mask layer 70 and the carved cavities 72. The cathode substrate 41 is sintered at a high temperature or in a vacuum to remove the mask layer 70 and part of the carbon nanotubes 62 adhered to the mask layer 70, simultaneously, and to connect the rest of the carbon nanotubes 62 firmly to the cathode conductive layer 42 as an electron emitter layer 43 formed and patterned thereby.

Figure 7:
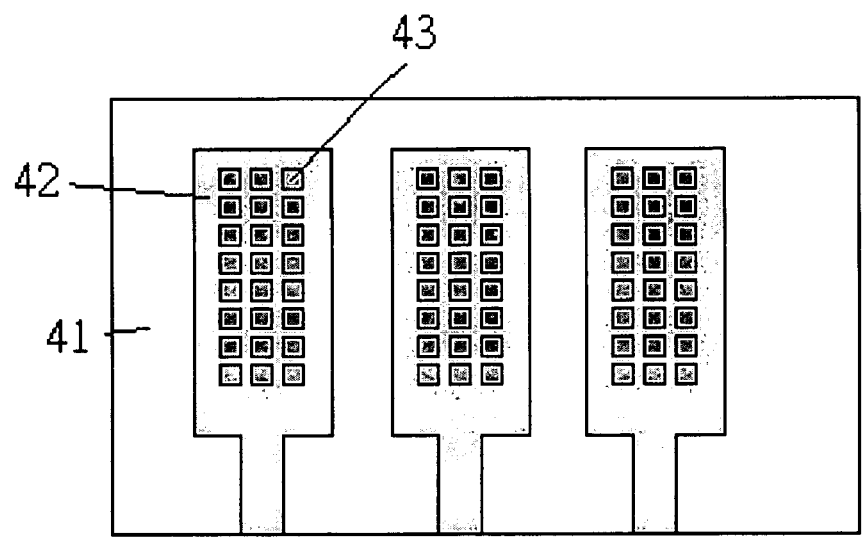
FIG. 7 is a top view of a patterned carbon nanotube according to the present invention.

A preferred embodiment of the present invention is described. First, an object, which can be a semi-finished cathode (glass) substrate 41 having the cathode conductive layer 42 formed already, is selected. A plurality of cathode electron emitter layers 43 is provided; each has a size of 20×20 square micrometers ($\mu m^2$) and is separated by 15 micrometers ($\mu m$) from each other cathode electron emitter layer 43, as illustrated in FIG. 7. Second, a negative photoresist macromolecule polyester dry film of ORDYL BF series, manufactured in Tokyo by Ohka Kogyo Co., LTD, is selected. The negative photoresist macromolecule polyester dry film has a film thickness of 30 micrometers (μm) laminates on the cathode (glass) substrate 41. The cathode (glass) substrate 41 is maintained at a temperature of 50 degrees centigrade, and the negative photoresist macromolecule polyester dry film is developed to have a mask layer 70 and a plurality of carved cavities 72 arranged therein. The carved cavities 72 are exposed to shape due to development by sodium carbonate solution after mercury excitation of an ultraviolet source, and then neutralized with dilute hydrochloric acid and baked to dry out residual liquid therein. Therefore, the carved cavities 72 are manufactured and each has a size of 20×20 square micrometers (μm$^2$). Third, a carbon nanotube spray is repeatedly sprayed 10 to 15 times thereon to form a carbon nanotube film on the cathode (glass) substrate 41. Fourth, the cathode (glass) substrate 41 having the carbon nanotube film formed thereon in a sintering process with an air pressure of 0.2 mega pascals (Mpa) is provided, under a temperature less than 400 centigrade degrees to oxidize fully the mask layer 70. Furthermore, nitrogen instead of air is gradually provided while the temperature is increased to between 400 and 500 degrees centigrade. In addition, during this high temperature process, the mask layer 70 and residues of carbon nanotubes 62 adhered thereto can be removed by airflow therein. According to this embodiment, each cathode electron emitter layer 43 has a carbon nanotube pattern formed thereon and with an area of about 18×18 square micrometers (μm$^2$), and each cathode electron emitter layer 43 has a thickness of about 1 to 2 18 micrometers (μm). The mask layer 70 is further cleaned via relative solutions. The present invention accordingly provides a starting electrical field of 2.1 volts per micrometer (V/μm), or a current density of 0.5 microamperes per square centimeter (μA/cm$^2$) alternatively, where the starting electrical field exceeds 3.0 voltages per micrometer (V/μm), and the current density consequently surpasses 10 microamperes per square centimeter (μA/cm$^2$).

The present invention provides steps of: (1) coating a negative photoresist layer on a cathode conductive layer of a cathode substrate; (2) making a mask layer 70 formed with a carved cavity 72 during a developing process; (3) spraying a carbon nanotube spray to fill the carved cavity 72 with a plurality of carbon nanotubes 62; (4) sintering the cathode substrate at a high temperature or in a vacuum to remove simultaneously the mask layer and part of the carbon nanotubes 62 adhered to the mask layer 70, and to connect the rest of the carbon nanotubes 62 firmly to the cathode conductive layer 42 as an electron emitter layer 43. The negative photoresist layer is made of macromolecule polyester and arranged on the cathode substrate 41 in a spin coating or a laminate manner. The macromolecule polyester includes polyvinyl alcohol and dichromate materials; the carbon nanotube spray includes a binder to connect the carbon nanotubes and the cathode conductive layer, and a dispersing agent to scatter powder materials in the carbon nanotube spray. The detailed composition of the carbon nanotube spray includes silver powder, saline with indium or indium-doped tin oxide (ITO) powder, and the binder includes glass powder or collodion. For meeting common requirements in the development and the sintering process, the negative photoresist layer has a thickness of between 10 and 30 micrometers (μm). For easy manufacturing and good production, a spray film after spraying the carbon nanotube spray is between 0.5 and 8 micrometers (μm) thick. The air pressure is 0.1 to 0.3 mega pascals (Mpa) at a temperature of less than 400 degrees centigrade during the sintering process, and the present invention further provides nitrogen instead of air gradually as the temperature is increased to between 400 and 500 degrees centigrade.

The present invention is characterized by:

1. The present invention provides technique of spraying the carbon nanotube spray thereon for the electronic emitter layer with high solution.
2. The present invention provides a plurality of carbon nanotubes exposed by of the electronic emitter layer for increasing current density and evening a thickness thereof.
3. The technique of spraying the carbon nanotube spray thereon is easy to carry out, and the carbon nanotube spray is easy to manufacture, so as to diminish the costs thereof and improve practice in commercial use.

It should be apparent to those skilled in the art that the above description is only illustrative of specific embodiments and examples of the invention. The invention should therefore cover various modifications and variations made to the herein-described structure and operations of the invention, provided they fall within the scope of the invention as defined in the following appended claims.

What is claimed is:

1. A patterned carbon nanotube process adopted for an electronic device, the process comprising:
    (1) coating a cathode substrate with a negative photoresist layer;
    (2) making a mask layer formed with a carved cavity during a developing process;
    (3) spraying with a carbon nanotube spray to fill a plurality of carbon nano-tubes in the carved cavity; and
    (4) sintering the cathode substrate at a high temperature or in a vacuum to remove simultaneously the mask layer and part of the carbon nano-tubes adhered to the mask layer, and to connect a remainder of the carbon nano-tubes firmly to the cathode conductive layer as an electron emitter layer;
    further comprising providing air pressure of about 0.1 to 0.3 mega pascals (Mpa) at a temperature of less than about 400 degrees centigrade during the sintering process, and providing nitrogen instead of air gradually while the temperature is increased to between about 400 and 500 degrees centigrade.

2. The patterned carbon nanotube process as claimed in claim 1, wherein the negative photoresist layer is made of macromolecule polyester and arranged on the cathode substrate in a spin coating or a laminate manner.

3. The patterned carbon nanotube process as claimed in claim 1, wherein the negative photoresist layer is made of macromolecule polyester and includes polyvinyl alcohol and dichromate materials.

4. The patterned carbon nanotube process as claimed in claim 1, wherein the carbon nanotube spray includes a binder to connect the carbon nano-tubes and the cathode conductive layer, and a dispersing agent to scatter powder materials in the carbon nanotube spray.

5. The patterned carbon nanotube process as claimed in claim 4, wherein the carbon nanotube spray includes silver powder, saline with indium or indium-doped tin oxide (ITO) powder, and the binder includes glass powder or collodion.

6. The patterned carbon nanotube process as claimed in claim 1, wherein the negative photoresist layer is made of macromolecule polyester and has a thickness of between about 10 and 30 micrometers (μm).

7. The patterned carbon nanotube process as claimed in claim 1, further including a spray film after spraying with the carbon nanotube spray with a thickness of between about 0.5 and 8 micrometers (μm).

* * * * *